May 20, 1930.   S. A. ESKILSON   1,759,609
OPTICAL SIGNAL DEVICE
Filed March 3, 1928
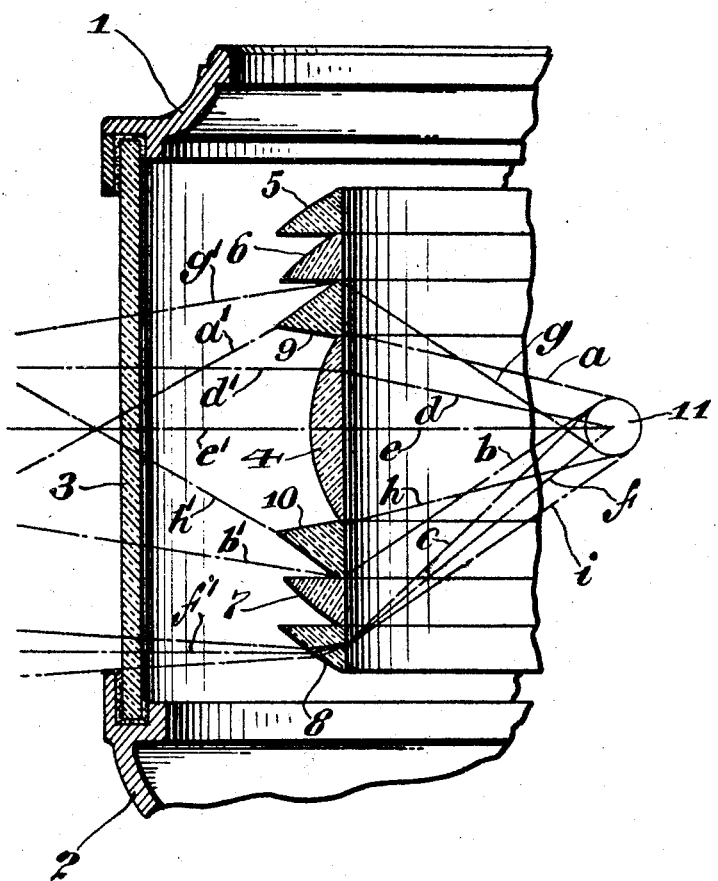
Inventor
Sven August Eskilson
By Cyrus N. Anderson
Attorney Patented May 20, 1930

1,759,609

UNITED STATES PATENT OFFICE

SVEN AUGUST ESKILSON, OF STOCKHOLM, SWEDEN, ASSIGNOR TO AMERICAN GAS-ACCUMULATOR COMPANY, OF ELIZABETH, NEW JERSEY, A CORPORATION OF NEW JERSEY

OPTICAL SIGNAL DEVICE

Application filed March 3, 1928. Serial No. 258,811.

My invention relates to optical signal devices of the character employed in lighthouses, upon floating buoys and the like. It is more particularly designed and adapted for use in association with a light mounted upon a floating buoy which may be located upon the waters of rivers, lakes, the ocean, branches of the latter and the like.

It has been found that when floating buoys were provided with dioptric lights of the construction heretofore known it frequently would happen that persons located upon the bridge of a vessel approaching and being in positions relatively near the said buoy would be above and out of line with the rays of light emanating from the source of light and therefore would be unable to observe the light; and it also has been found that persons located near the surface of the water and in positions relatively near the light would be unable to observe or see the same, because of their location below and out of line with the rays of light emanating from the source.

It is desirable, in the case of a device of this character, that it be visible from points both in near and far relation with respect thereto, regardless of the positions of said points.

The general object, therefore, of the invention is to provide an optical device of novel and improved construction including means whereby it is rendered visible by rays of light emanating from the light source thereof from points located in both near and far relation with respect thereto.

It also is an object of the invention to provide an optical device including novel means of relatively great efficiency and simplicity for rendering the same visible or observable from points located in both near and far relation with respect thereto.

A further object of the invention is to provide an optical signal device including both light condensing and light dispersing means in combination to afford means whereby rays of light emanating from the source of light may render the same visible or observable from points located in near as well as far relation thereto.

Without attempting to set forth in further detail the objects and advantages of my invention I shall now proceed to a detailed description thereof wherein other objects and advantages will be specifically set forth or will become apparent.

In order that the invention may be readily understood and its manifold practical advantages fully appreciated reference may be had to the accompanying drawing wherein I have illustrated one form of construction embodying the said invention and the principle involved therein.

It will be understood that the invention is susceptible of embodiment in other forms of construction than that illustrated herein, and that various changes may be made in the details of construction within the scope of the claims without departing from the said invention.

In the drawing I have shown a view in vertical section of a portion of a device embodying the invention, the said view being taken in a plane extending radially from the axis of the structure, the said plane including the focal point of the lenses of the device.

I have shown in the drawing only fragmentary portions of the frame structure of the device, which portions are indicated at 1 and 2. The device embodying the invention is encircled or inclosed, as usual, by a transparent circular sheet 3, preferably of glass, which is mounted upon the portions of the frame structure indicated at 1 and 2.

The device comprises an intermediate circular lens 4, of plano-convex shape in cross section, the said lens being of known construction and located in the same relation to other lenses of the structure as heretofore has been the case in dioptric lights of the general character of that disclosed; and also comprises lenses 5, 6, 7 and 8 of the usual or standard construction, the outer surfaces of which are convex and the other surfaces of which are plane, as is clearly indicated in the drawing. The said lenses 5, 6, 7 and 8 are circular or extend around and in concentric relation to the axis of the system or device as also does the lens 4. All of the lenses, 4 and 5 to 8 inclusive, consist of transparent light refracting material, preferably glass, and are of the type known as condensing lenses.

Instead of lenses of standard type or of the usual character found in adjoining relation to the opposite edges of the central lens 4 I have provided lenses or prisms 9 and 10, which are of different shape in cross-section from the condensing lenses 5, 6, 7 and 8 and constitute light deflecting and dispersing means. The lenses or prisms 9 and 10 may consist of any suitable transparent material which is light refracting, but preferably consist of glass. The said lenses or prisms 9 and 10 extend around and are concentric with the axis of the device. The outer surfaces of the said lenses or prisms 9 and 10 are substantially plane, as indicated in the drawing.

In the construction, as illustrated, I have provided light deflecting and dispersing means in adjoining relation to both of the edges of the lens 4, but I desire it to be understood that only one of these light dispersing elements may be employed, in which event the other, or opposite element, would or may be replaced by a standard lens element like those indicated or designated by the reference numerals 5, 6, 7 and 8. However, I have illustrated in the drawing the preferred arrangement in which two dispersing elements are employed, one in adjoining relation to each of the edges of the lens 4 as shown.

The light which is indicated at 11 usually consists of a gas flame, but it will be understood that the invention is not limited to a light source of any particular or especial character. The rays of light emitted from the source 11 may emanate or radiate from any point thereof, as indicated by the dash and dot lines $a$, $b$, $c$, $d$, $e$, $f$, $g$, $h$ and $i$. The rays of light which emanate from the source 11 and which pass through the lenses 4, 5, 6, 7 and 8 are condensed in known manner. Those rays which emanate from a point coincidental with the focal center of the said lenses, after passage through the said lenses and because of their refraction, are parallel to each other, as indicated by the dash and dot lines $d'$, $e'$ and $f'$.

I have not indicated the direction taken by the refracted rays which issue from the lenses 5, 6 and 7, but it will be understood that they take the same direction as in the known constructions of this character which are in use generally.

The directions taken by the rays of light which pass through the light deflecting and dispersing elements 9 and 10, after refraction, are indicated by the dash and dot lines $a'$, $g'$, $b'$ and $h'$.

It will be noted that the refracted rays $a'$ and $g'$ extend in a downward direction so that a person located near the water and in a relatively near position with respect to the device would be able to observe or see the same, whereas the refracted rays $b'$ and $h'$ extend in diverging relation to each other in an upward direction so that a person located in an elevated position, as upon the bridge of a vessel, and relatively near the device would be able to observe or see the same.

The invention or improvement disclosed herein consists of the employment of light deflecting means, such as the elements 9 and 10 in association or combination with the standard lens elements of dioptric light structures. By the employment of light deflecting elements, as in my construction, I am able to obtain the desired lighting or signaling effect with the sacrifice of a relatively small percentage only of the condensing lens portion of the structure. It will be understood that the light deflecting elements may be located in different positions with respect to the intermediately located lens 4 from those in which they are shown in the drawing.

Having thus described my invention, what I claim and desire to secure by Letters Patent is:

1. In an optical signal device, the combination of a condensing lens, a light deflecting element located in contiguous relation to an edge of the said lens, one or more condensing lenses located in adjoining relation to the outer edge of the said light deflecting element and a source of light located to include the focal center of the said lenses, the rays of light from said source which pass through the said light deflecting element being refracted and issuing therefrom in directions extending transversely of and across a horizontal plane including the focus of the said lens.

2. In an optical signal device of drum type, the combination of an intermediate light condensing lens, light deflecting elements consisting of prisms of transparent light refracting material located with their bases in adjoining relation to the opposite edges of the said condensing lens, condensing lenses located outside of and in adjoining relation to the apexes of the said prisms, and a source of light located practically at the focal center of the said lenses, the rays of light from said source which pass through the said light-deflecting elements being refracted and issuing therefrom in directions extending transversely of and across a horizontal plane including the focus of the said lens.

In testimony that I claim the foregoing as my invention, I have hereunto signed my name this 10th day of February, A. D. 1928.

SVEN AUGUST ESKILSON.